United States Patent [19]
Reitsema et al.

[11] 3,758,548
[45] Sept. 11, 1973

[54] LIQUID ESTERS OF NAPHTHALENE DICARBOXYLIC ACIDS

[75] Inventors: Robert H. Reitsema, Denver, Colo.; Nylen L. Allphin, Jr., Pinole, Calif.

[73] Assignee: Marathon Oil Company, Findlay, Ohio

[22] Filed: Oct. 7, 1971

[21] Appl. No.: 188,690

Related U.S. Application Data

[63] Continuation-in-part of Ser. No. 544,419, April 22, 1966, Pat. No. 3,624,133, which is a continuation-in-part of Ser. No. 292,495, July 2, 1963, abandoned, which is a continuation-in-part of Ser. No. 144,527, Oct. 12, 1961, abandoned.

[52] U.S. Cl. .......................................... 260/475 FR
[51] Int. Cl. ............................................. C07c 69/76
[58] Field of Search ............................... 260/475 FR

[56] References Cited
UNITED STATES PATENTS

| | | | |
|---|---|---|---|
| 3,624,133 | 11/1971 | Reitsema et al. | 260/475 |
| 3,042,709 | 7/1962 | Convery | 260/475 |
| 3,042,708 | 7/1962 | Mills et al. | 260/475 |

OTHER PUBLICATIONS

Radt, Elsevier's Encyclopedia of Organic Chemistry, Vol. 12B, pp. 4681, 4695, 4704, 4725, 4728, 4730, 4733 (1954).
Reference A is Parent; References B, C & R Supplied in Parent.

*Primary Examiner*—Lorraine A. Weinberger
*Assistant Examiner*—E. Jane Skelly
*Attorney*—Joseph C. Herring et al.

[57] ABSTRACT

The present invention comprises esters selected from the group consisting of esters of 1,6-naphthalene dicarboxylic acid and an aliphatic hydrocarbon alcohol having 4-8 carbon atoms; esters of 2,3-naphthalene dicarboxylic acid and an aliphatic hydrocarbon alcohol containing 5-8 carbon atoms; and esters of a naphthalene dicarboxylic acid and a branch chain alkane alcohol having at least 2 carbon atoms in the branch when the branch is closer to the hydroxyl-substituted carbon atom than the gamma position.

1 Claim, No Drawings

LIQUID ESTERS OF NAPHTHALENE DICARBOXYLIC ACIDS

This application is a continuation-in-part of application Ser. No. 544,419 filed Apr. 22, 1966, now U.S. Pat. No. 3,624,133, which is a continuation-in-part of Ser. No. 292,495 filed July 2, 1963 (now abandoned) which is a continuation-in-part of Ser. No. 144,527 filed Oct. 12, 1961 (now abandoned).

This invention relates to new liquid esters of naphthalene dicarboxylic acids and more particularly to specific normal and branch chain di-esters of 2,3-; 1,6-; 2,7-; etc., isomers of dicarboxynaphthalenes and mixtures of such acids.

Various esters of naphthalene dicarboxylic acids are known. *Elsevier's Encyclopedia of Organic Chemistry*, Vol. 12B, 1953, pp 4681–4733, describes the properties of various dimethyl and diethyl esters of the naphthalene dicarboxylic acids. The dibutyl and diphenyl esters of naphthalic acid are also described.

Though the art teaches the di-esters to be solids, we have surprisingly discovered that our new esters are liquids, including the esters of 1,6-naphthalene dicarboxylic acid and an aliphatic hydrocarbon alcohol having 4–8 carbon atoms; the esters of 2,3-naphthalene dicarboxylic acid and an aliphatic hydrocarbon alcohol containing 5–8 carbon atoms; and the esters of a naphthalene dicarboxylic acid and a branched alkane alcohol having at least 2, and preferably from 2 to about 8, carbon atoms in the branch when the branch is closer to the hydroxyl-substituted carbon atoms than the gamma position. Preferably, the esters of the naphthalene dicarboxylic acid and branched alkane alcohol mentioned above, will contain from 16 to 28, more preferably from 16 to 24, and most preferably from 16 to 20 carbon atoms.

That the compounds of the present invention are liquids at or very near room temperature, is especially unexpected in view of the fact that while the literature mentions many of the closely related naphthalene esters, to the best of our knowledge, no mention is made in the literature of any of these closely related compounds being liquid. (See for example Elsevier, supra and U. S. Pat. No. 3,042,708 to Mills and Jezl and U. S. Pat. No. 3,042,709 to Convery.)

The property of liquidity makes the compounds of the present invention useful for purposes for which non-liquid closely related naphthalene esters are not suited. For example, the compounds of the present invention may be mixed with solid reagents, e.g., Grignard reagents, hydrazene and other compounds to form reaction mixtures without the presence of solvents thus simplifying recovery of the resulting products.

Also, liquid mixtures containing the naphthalene esters of the present invention, together with solid or liquid chain-forming reagents, e.g., polyamines especially diamines or triamines, can be formulated to provide adhesive compositions which can be readily spread and which polymerize without the need for solvent evaporation. The absence of solvents from such formulations avoids the problems of weakening of plastic surfaces which are to be joined, and of pockmarking and pinholing which are frequently caused by the escape of solvents during the hardening process.

Especially important, the liquid naphthalene esters of the present invention are useful as plasticizers for plastics, e.g, vinyl chloride. The liquidity of the newly discovered naphthalene esters of the present invention permits them to be mixed into vinyl chloride and other polymeric formulations more readily than solid components. Typical plasticized compositions are vinyl chlorides containing from 5 to about 45 percent by weight of the naphthalene esters of the present invention. Such formulations exhibit good low temperature flexibility.

In addition to the above discussed chemical utilities to which the naphthalenes of the present invention are suited by virtue of unexpected property of liquidity, this same property enables their use in a number of primarily physical applications. For example their viscosities and densities suit them for use in specialized applications such as ore flotation, and manometer fluids; their viscosities and thermal conductivites permit their use as heat transfer media even at room temperatures; their liquidity, together with their coefficient of thermal expansion permit their use in the filling of expansible bellows, e.g., as used in thermally actuated electrical switches and valves.

All of these physical and chemical utilities are surprising and unexpected in view of the absence from the literature of any mention of liquid naphthalene esters of the general configuration of the new compound of the present invention.

The esters of this invention are prepared by reacting the dicarboxynaphthalene, or its monomeric anhydride, with the alcohol in the presence of an acid catalyst. The reaction is carried out so that water is removed as it is formed during the reaction. The reaction is carried out at from about 75° to about 150°C and in the presence of an excess of alcohol. Preferably, the reaction is carried out at temperatures of from about 100° to about 135°C in the presence of a 4:1 mole ratio of alcohol to naphthalene dicarboxylic acid. Solvents useful in carrying out the reaction include reaction-inert solvents such as the high boiling ethers, ketones, etc. It is preferable to dissolve the naphthalene in an excess of alcohol and to provide an azeotroping agent such as benzene or toluene to remove the water of reaction. Normally, only from about 0.01 to about 0.1 equivalent of acid catalyst is required to catalyze the esterification. However, more can be used if desired. While quite a number of acids are operative for the purpose of esterification, including sulfuric acid, boron trifluoride, zinc chloride, pyrophosphoric acid, etc., sulfuric acid is the preferred catalyst.

The following examples more fully illustrate the invention.

EXAMPLE I

PREPARATION OF THE DI-ISO-PENTYL ESTER OF 2,3-DICARBOXYNAPHTHALENE

About 70 grams of a substantially purified 2,3-anhydride of 2,3-dicarboxynaphthalene was heated with stirring in about 200 grams of iso-pentyl alcohol and about 1 gram of concentrated sulfuric acid. When the temperature reached about 125° all of the anhydride had gone into the solution. The reaction was carried on in a distillation flask equipped for continuous refluxing and removal of water as it is formed. The reaction was continued until about 5 ml of water had been removed. About 60 ml of the alcohol was also removed with the 5 ml of water. The reaction mixture was cooled, diluted with about 500 ml of benzene, shaken once with about 200 ml of 5 percent sodium bicarbonate solution, separated, and then shaken twice with about 300 ml of water. The recovered organic phase was then dried over sodium sulfate and all of the benzene and most of the excess alcohol was removed by evaporation on a hot plate with the aid of an air jet. The remainder of the alcohol was distilled away at about atmospheric pressure, and the distillation was completed under about 25 mm of mercury vacuum at a temperature of about 200°C. The residue was then vacuum distilled and the recovered forerun boiled at 120° – 187° at 0.1 mm. The product fraction boiled at 180° at 0.075 mm. About 115 grams of product was recovered as a clear, water-white viscous liquid, having an index of refraction of $n_D^{23} = 1.5391$. The pot residue was discolored but not tarry and it weighed about 4.1 grams. The purified product amounted to 91.4 percent of theoretic yield based on anhydride.

EXAMPLE II

PREPARATION OF DI-N-OCTYL ESTER OF 2,3-DICARBOXYNAPHTHALENE

Following the procedure of Example I, a mixture of about equal parts (200 grams each) of n-octanol and benzene were mixed with about 50 grams of 2,3-dicarboxynaphthalene and about 2 grams of concentrated sulfuric acid. The mixture was refluxed until the dissolution was complete and no appreciable amount of water was removed by azeotropic distillation. The reaction mixture was then cooled and washed with a 5 percent sodium bicarbonate solution followed by three washes with water. The organic phase was then dried over sodium sulfate and the benzene removed on a rotary evaporator. The octanol, which was unreacted, was removed by vacuum distillation at a temperature of about 60° – 63°C at 0.5 mm. Toward the end of the distillation period, a solid sublimed and condensed in the condenser. This was subsequently identified as the 2,3-anhydride by a mixture melting point determination. The residue from this distillation was taken up in benzene, chilled, filtered, and the benzene removed by evaporation on a water bath. After the removal of a small amount of anhydride by vacuum filtration, the crude ester was purified by simple distillation to give a product boiling at 224° – 225°C at 0.075 mm, with a refractive index of $n_D^{22.5} = 1.5257$. The yield of the di-octyl ester of 2,3-dicarboxynaphthalene was 51.5% based on the unrecovered acid.

EXAMPLE III

PREPARATION OF DI-N-BUTYL ESTER OF 1,6-DICARBOXYNAPHTHALENE

Following the procedure of Example I, about 70 grams of 1,6-dicarboxynaphthalene was reacted with about 500 ml of n-butanol and about 10 grams of concentrated sulfuric acid. The mixture was refluxed until the dissolution was complete and water no longer distilled over. The mixture was worked up in the usual manner and the crude product was distilled under vacuum to provide a pre-cut of about 15 grams having a boiling point of 118° – 135° at 0.07 mm, and a refractive index of $n_D^{22} = 1.4865$, and about 65 grams of a light yellow product which had a boiling point of 172°C at 0.07 mm, and a refractive index of $n_D^{22} = 1.5585$. This amount of product represents a yield of about 62 percent. The infrared absorption spectra indicated the presence of an ester group.

EXAMPLE IV

PREPARATION OF DI-N-OCTYL ESTER OF 1,6-DICARBOXYNAPHTHALENE

By refluxing 50 grams of 1,6-dicarboxynaphthalene with about 300 ml of n-octanol in 300 ml of benzene and with about 2 grams of concentrated sulfuric acid, the corresponding ester was made in accordance with the procedure of Example I. The refluxing was continued until no further water was removed by azeotropic distillation. The solution was then evaporated with an air jet on a water bath to remove the benzene and the remaining octanol. The residue was then vacuum distilled to provide a yellow, viscous oil, having a boiling point of 237° – 240°C at 0.075 mm. This product slowing solidified in the condenser and the final product appeared as a white paste with an apparent melting point quite near room temperature.

EXAMPLE V

VISCOSITIES OF LIQUID ESTERS

The following table shows the viscosity of various samples of the liquid esters of various dicarboxynaphthalenes.

| Compound | Kinematic 100°F | Viscosity 201°F | Viscosity Index |
|---|---|---|---|
| Di-n-octyl-2,3-naphthalene-dicarboxylate | 60.0 | 7.03 | +70.0 |
| Di-n-pentyl-1,6-naphthalene-dicarboxylate | 48.5 | 6.315 | +50.7 |
| Di-n-pentyl-2,3-naphthalene-dicarboxylate | 48.5 | 5.94 | +13.0 |
| Di-n-butyl-1,6-naphthalene-dicarboxylate | 27.0 | 4.34 | −21.6 |
| Di-n-octyl-1,6-naphthalene-dicarboxylate | 175.5 | 13.60 | +46.7 |
| Di-isopentyl-2,3-naphthalene-dicarboxylate | 77.5 | 7.29 | −18.2 |

The viscosity index was calculated from ASTM Standard viscosity temperature charts and tables D:341–43. The formula for the viscosity index is V.I. = L − U/D × 100.

EXAMPLE VI

PREPARATION OF DI-2-ETHYL-1-HEXYL ESTER OF 1,6-DICARBOXYNAPHTHALENE

About 500 grams of 1,6-dicarboxynaphthalene and about 750 grams of 2-ethyl-1-hexanol, about 300 ml of toluene and about 20 grams of concentrated sulfuric acid were stirred at reflux temperatures until the theoretical water of reaction was recovered. The water was removed as a water-toluene azeotrope. The reaction mixture was cooled, washed with sodium hydroxide and finally water. The remaining toluene and alcohol were distilled and the di-ester isolated. The ester was found to have a boiling point of 230°C at 0.07 mm and to have a refractive index of $n_D^{20} = 1.5338$.

The 2-ethylhexanol esters of the various dicarboxylic acids are unique in that on being cooled they apparently do not crystallize but form glass-like materials. The rigid noncrystalline structure of these esters relaxes on warming.

EXAMPLE VII

PREPARATION OF DI-ESTERS OF MIXED ACIDS DERIVED FROM A PETROLEUM FRACTION

An aromatic composition of catalytic cycle oil was recovered by selective extraction, as by gammabutyrolactone, from a catalytic cycle oil having a boiling range to include mostly dimethylnaphthalenes. The dimethylnaphthalenes were oxidized to produce mixed acids, which acid mixture consists essentially of mixed dicarboxynaphthalenes. About 400 grams of the mixed acids were reacted with about 700 grams of 2-ethyl-1-hexanol alcohol in about 500 ml of toluene with 20 grams of concentrated sulfuric acid. The reaction was carried out under refluxing conditions to continuously remove the water which was formed in the reaction as an azeotrope. Following the reaction period the cooled mixture was washed with a 5 percent base solution and then with water to remove unreacted acid. The resultant mixture was dried with anhydrous $MgSO_4$ and distilled to remove unreacted alcohol and toluene. On vacuum distillation, a main cut was recovered which boiled at 200° – 230°C and had a refractive index of $n_D^{23.5} = 1.5224$. The fore-cut boiled at about 153° – 200°C at 0.08 mm. The product or second cut consisted essentially of the di-esters of the mixed acids.

EXAMPLE VIII

MELTING POINTS OF NAPHTHALENE DICARBOXYLIC ACIDS

The following table indicates the small number of liquid esters as compared to the large number of solid esters of naphthalene dicarboxylic acids.

Melting Points of Esters of 2,6-Naphthalene Dicarboxylic Acid

| Ester | Corrected Melting Point, °C |
|---|---|
| Dimethyl | 189.5–190.0 |
| Diethyl | 126.5–127.0 |
| Di-n-propyl | 83.5–85.0 |
| Di-n-butyl | 79.5–80.0 |
| Di-n-pentyl | 76.0–77.0 |
| Di-n-hexyl | 88.5–89.0 |
| Di-n-heptyl | 81.0–82.0 |
| Di-n-octyl | 80.0–81.0 |
| Di-n-nonyl | 68.5–69.5 |
| Di-n-decyl | 80.5–81.0 |
| Di-n-undecyl | 74.0–74.5 |
| Di-n-dodecyl | 52.0–53.0 |
| Di-n-tetradecyl | 87.0–88.0 |
| Di-n-pentadecyl | 82.0–83.0 |
| Di-n-hexadecyl | 79.5–80.0 |
| Di-isopropyl | 118.0–119.0 |
| Di-isobutyl | 85.0–86.0 |
| Di-isopentyl | 62.0–63.0 |
| Di-cyclooctyl | 97.5–98.5 |
| Di-cycloheptyl | 129.5–130.0 |
| Di-cyclopentyl | 137.5–138.5 |
| Di-cyclohexyl | 154.5–155.0 |
| Di-phenylethyl | 134.0–134.5 |
| Di-2,6-dimethyl-4-heptyl | 17.5–18.5 |
| Di-2-ethoxyethyl | 69.0–70.0 |

Melting Points of Esters of 1,6-Naphthalenedicarboxylic Acid

| | |
|---|---|
| Dimethyl | 98.0–98.5 |
| Diethyl | 48.0–49.0 |
| Di-n-butyl | –7.0—–9.0 |
| Di-n-pentyl | –26.0—–29.0 |
| Di-n-hexyl | –24.0—–27.0 |
| Di-n-octyl | –6.0—–8.0 |
| Di-isopentyl | |
| Di-2-ethylhexyl | |

Melting Points of Esters of 2,7-Naphthalenedicarboxylic Acid

| | |
|---|---|
| Dimethyl | 135.5–136.0 |
| Diethyl | 69.5–70.0 |
| Di-n-butyl | 44.5–45.0 |
| Di-n-pentyl | 23.0–23.5 |
| Di-n-hexyl | 38.5–39.0 |
| Di-n-octyl | 38.5–40.0 |
| Di-isopentyl | 2.0–4.0 |

What is claimed is: 1. The di-ester of 2,7-naphthalene dicarboxylic acid and isopentyl alcohol.

* * * * *